3,576,815
BISPYRIDINIUM COMPOUNDS
William Carter Doyle, Shawnee Mission, Kans., assignor to Gulf Research & Development Company, Pittsburgh, Pa.
No Drawing. Original application Aug. 24, 1966, Ser. No. 574,541, now Patent No. 3,458,305. Divided and this application Sept. 6, 1968, Ser. No. 778,892
Int. Cl. C07d 31/22
U.S. Cl. 260—296                                           7 Claims

ABSTRACT OF THE DISCLOSURE

Novel 4,4'-bispyridinium compounds which contain divalent conjugated structures between the pyridine rings have unusual characteristics which make them useful as selective herbicides and as indicator reagents in colorimetric analysis. Particularly interesting are the 4,4'-[2,5-(1,3,4-thiadiazol)-ylene] bispyridinium halides which are represented by the following structural formula:

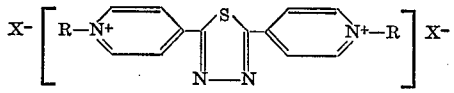

When R is a hydrocarbon substitutent group with a molecular weight less than about 150, these compositions exhibit both good activity and selectivity, and are useful in post-emergent control of broad-leaf weeds in crops such as corn, wheat, oats, and sorghum grains.

---

This is a division of U.S. patent application Ser. No. 574,541, now U.S. Pat. 3,458,305 granted on July 29, 1969.

More particularly this invention is directed to certain highly colored bispyridinium compounds in which the two pyridinium salt structures are connected by means of a divalent structure which contains a conjugated system of valence bonds. These compounds, many of which are novel, may be described as represented by the following structural formula

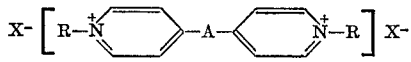

in which X⁻ is a halide ion, R is a hydrocarbon substitutent group having a molecular weight less than about 150 and A is selected from divalent structures represented by the formulas

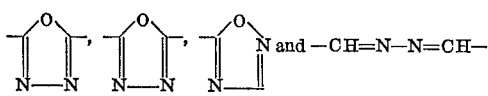

The compounds are highly colored and exhibit abrupt color changes in both changing pH and oxidation-reduction reactions.

These compounds are also found to possess improved phytotoxic selectivity as compared with bipyridinium salts, which imparts utility for the purpose of controlling unwanted vegetation in close proximity to growing crops. Of particular interest are the 4,4'-[2,5-(1,3,4-thiadiazol)

ylene] bispyridinium halides which are represented by the following structural formula:

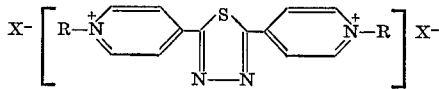

When R is a hydrocarbon substitutent group with a molecular weight less than about 150, these compositions exhibit both good activity and selectivity, and are useful in post-emergent control of broad-leaf weeds in crops such as corn, wheat, oats, and sorghum grains.

The general method of preparation of the thiadiazolylenebis compounds is illustrated by the following equation and Example I:

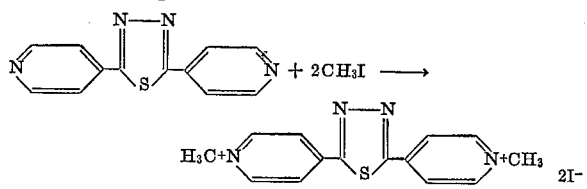

All temperatures given in the illustrative examples are in degrees centigrade.

EXAMPLE I

A quantity of 2,5-bis(4-pyridyl)-1,3,4-thiadiazole is prepared according to the procedure disclosed in J. Am. Pharmaceutical Assoc. vol. 42, p. 457 (1953). Then a slurry of 8.5 g. of 2,5-bis(4-pyridyl)-1,3,4-thiadiazole and 150 ml. of dimethyl formamide at 50° is added to 12.0 g. of methyl iodide and the mixture is stirred. The starting solid slowly dissolves, the solution becomes deep red and a red solid begins to precipitate. After four hours at 50–55°, the mixture is cooled to room temperature, filtered by suction and the solid washed with acetone, giving 14.2 g. of 2,5-bis(4-pyridyl)-1,3,4-thiadiazole bis methiodide, melting at 289–292° with decomposition. Dilution of the filtrate by the acetone washings gives a second crop (2.6 g.) melting a 292–295° with decomposition.

The preparation of bis methiodide compounds of this invention may be represented as follows:

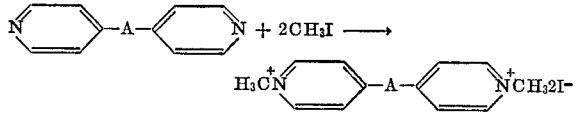

EXAMPLE II

Below are listed dimethyl bis methiodides prepared by the general method of Example I, in which the divalent structure A is different for each compound.

| —A— | Reaction temperature | Reaction time, hours | Percent yield | M.P. of Product, (dec.) |
|---|---|---|---|---|
| ![N-S ring] (1) | 50–65° | 2½ | 90 | 301–3° |
| —HC=N—N=CH— (2) | 55–60° | 2 | 73 | 190° |

(1) The 3,5-bis(4-pyridyl)-1,2,4-thiadiazole starting material was prepared by the method disclosed in J. Am. Chem. Soc. vol. 77, pg. 4062 (1955).
(2) The free base employed as starting material is prepared according to the procedure disclosed in J. Am. Chem. Soc. vol. 81, p. 962–6 (1959).

EXAMPLE III

Preparation of a higher alkyl bis quaternary compound is illustrated in the following equation:

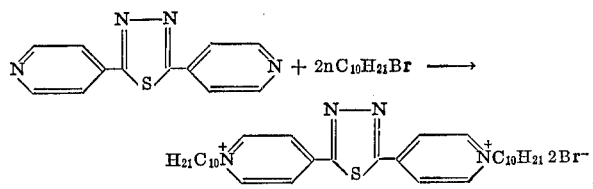

The procedure corresponding to the above equation is as follows: A solution of 6.0 g. of 2,5-bis(4-pyridyl)-1,3,4-thiadiazole and 11.0 g. of n-decyl bromide in 100 ml. of dimethyl formamide is heated 22 hrs. at 100–105° and cooled. Filtration of the precipitated solid and washing with acetone gives 5.9 g. of didecyl 4,4'-[2,5-(1,3,4-thiadiazol)ylene] bispyridinium dibromide, melting at 245–7° with decomposition. Dilution of the filtrate by the acetone washings precipitates an additional 3.9 g. of product melting at 246–8° with decomposition.

EXAMPLE IV

In the following equation and table are listed other thiadiazolylene bis quaternary ammonium salts prepared by the general method of Example III

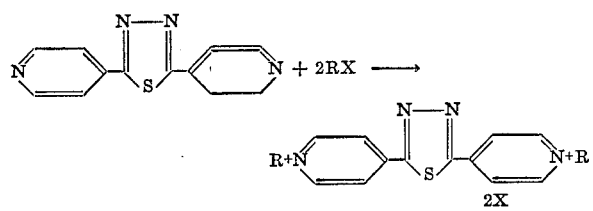

TABLE

| R | X | Reaction temperature | Reaction time, hours | Percent yield | M.P. of product, (dec.) |
|---|---|---|---|---|---|
| n-C$_4$H$_9$ | Br | 95–100° | 19 | 58 | 234–6° |
| C$_6$H$_5$CH$_2$ | Cl | 100–105° | 6 | 42 | 206–220° |

EXAMPLE V

Preparation of bis quaternary ammonium chloride from corresponding iodides is illustrated below, employing a quaternary iodide prepared by the procedure of Example I from 2,5-bis(4-pyridyl)-1,3,4-oxadiazole made according to the procedure disclosed in Zhur. Obshchei Khim. vol. 30, p. 3240 (1960).

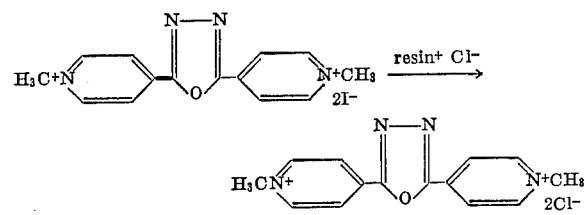

A solution of 10 g. of 2,5-bis (4-pyridyl)-1,3,4-oxadiazole bis methiodide in 50 ml. of water is stirred ½ hour with 50 g. of a strong base anion exchange resin (chloride form). The slurry is filtered, the resin is washed with 50 ml. of water and the aqueous filtrate is poured into 600 ml. of acetone, precipitating a yellow solid. Filtration of this solid and washing with acetone gives 4.6 g. of 2,5-bis (4-pyridyl)-1,3,4-oxadiazole bis methochloride, melting at 255–8° with decomposition.

EXAMPLE VI

Using the procedure illustrated in Example V, 2,5-bis(4-pyridyl) - 1,3,4 - thiadiazole bis methiodide is converted in 65% yield to the corresponding bis methochloride, melting at 285–8° with decomposition.

EXAMPLE VII

The novel bis quaternary salts of the present invention show a variety of interesting color reactions in aqueous solution which are useful in analytical chemistry; those which are particularly interesting and useful including (1) an intense green coloration in the presence of strong reducing agents such as zinc dust and sodium dithionite, the color being discharged reversibly by bubbling air through the solution; (2) a strong red color in the presence of primary and secondary aliphatic amines and (3) on increasing the pH of the solution, an abrupt change from colorless to yellow at around pH 7–8 with a gradual change to orange at higher pH values (both of these color changes are reversible).

The color change in (1) above may be used to indicate the end point in analytical titrations using strong reducing agents. For example, the titration of commercial sodium hypochlorite bleach solution with sodium thiosulfate in the presence of 2,5-bis(4-pyridyl)-1,3,4-oxadiazole bis methochloride shows a sudden change from colorless to green at an end-point corresponding to 4.6% NaOCl in the bleaching solution. Since the standard iodometric titration of the same solution gives a value of 4.87 percent, the new reagent yields a reference point prior to complete reduction. The end point appears to be sharply defined and relatively stable on exposure to the atmosphere.

The new compositions yield accurate determinations of equivalence point in the titration of a strong acid with a strong base, as illustrated below:

A 20.0 ml. portion of 0.1003 N H$_2$SO$_4$ is diluted with 50 ml. distilled water, 20 drops of a solution of 0.02 g. of 2,5 - bis(4 - pyridyl) - 1,3,4 - oxadiazole bis methochloride in 10 ml. water is added and the solution is titrated with 0.0997 N NaOH. A sharp color change from colorless to yellow occurs after the addition of 20.6±0.1 ml. of the titrant.

In the discussion below there is illustrated the use of the novel compositions as selective post-emergence herbicides.

The species of plants on which the compound was to be used were planted in four-inch pots in the greenhouse. Ten to eighteen days after emergence of the plants, three pots were sprayed with each aqueous dispersion of active agent, prepared as follows: An emulsifiable concentrate was made by combining 0.4 g. of the chemical to be tested with 4 ml. of a solvent-surfactant mixture (3 parts of polyoxyethylated vegetable oil and 1 part kerosene or other hydrocarbon solvent). The emulsifiable concentrate was then mixed with a suitable amount of water, with agitation, so as to provide a convenient concentration for the particular application rate. Various rates of application of the active chemical per acre were employed as indicated in the table at a spray volume of about 60 gallons per acre. Approximately one week after the spray application the plants were observed and the results rated according to the following schedule.

Type of action: Degree
C=chlorosis (bleaching) _____ 0=No effect.
N=necrosis _____ 1=Slight effect.
G=growth inhibition _____ 2=Moderate effect.
F=formative effect (abnormal form 3=Severe effect.
    of growth) _____ 4=Maximum effect
K=non-emergence _____ (all plants died).

Results are tabulated below.

In a field test of the compound of Example I in comparison with paraquat using the same spray formulation as in the greenhouse tests, the new bis quaternary compound successfully controlled broadleaf weeds, including pigweed and morning glory, with only slight effect on corn and milo at an application rate of ½ lb. per acre. In the same test at the same application rate, paraquat gave a non-selective, complete kill of all vegetation. The phytotoxic selectivity which is characteristic of the new compositions makes them particularly useful as herbicides for control of weeds in grain crops. The dimethyl 4,4'-[2,5-(1,3,4-oxadiazole)ylene] bispyridinium chloride is particularly useful in a method of combating weeds in a heavily weed-infested area, while at the same time raising a crop of grain sorghum (milo) on the land. By repeated use of the method on the same land the concentration of viable weed seeds in the soil will eventually be reduced to a normal level, without the soil being rendered unusable for a period of time, as occurs with drastic methods of dealing with heavy weed infestations.

What is claimed is:

1. The compound represented by the formula

2. The compound represented by the formula

3. The compound represented by the formula

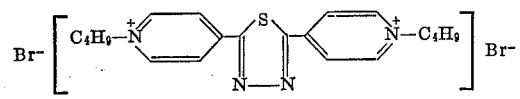

4. The compound represented by the formula

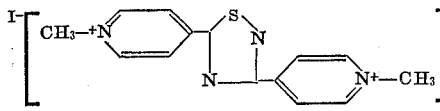

5. The compound represented by the formula

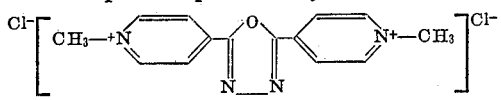

6. The compound represented by the formula

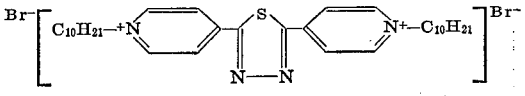

7. The compound represented by the formula

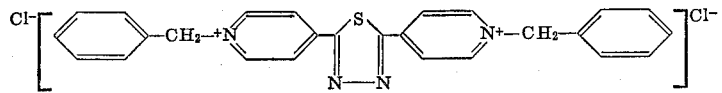

References Cited
UNITED STATES PATENTS
3,458,305   7/1969   Doyle _____ 260—240X

OTHER REFERENCES

Szmant et al., J. Am. Chem. Soc. vol. 81, pp. 962–3 and 966 (1959).

Klingsberg, Pyridine and Its Derivatives, part four, pp. 173–4 and 195–6, Interscience Publishers (1964).

Klemm et al., J. of Chromatography, vol. 23, pp. 428–435 (1966).

JOHN D. RANDOLPH, Primary Examiner

U.S. Cl. X.R.

23—230; 71—90, 94; 252—408; 260—240